(12) United States Patent
Krebs et al.

(10) Patent No.: US 10,131,334 B2
(45) Date of Patent: Nov. 20, 2018

(54) BRAKE FLUID CONTAINER

(71) Applicant: Continental Teves AG & Co. oHG, Frankfurt (DE)

(72) Inventors: Werner Krebs, Hambach (DE); Stephan Krebs, Eschborn (DE); Horst Krämer, Ginsheim-Gustavsburg (DE); Harald König, Ober-Mörlen (DE); Stephan Schlicht, Nauheim (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 123 days.

(21) Appl. No.: 15/408,110

(22) Filed: Jan. 17, 2017

(65) Prior Publication Data
US 2017/0217414 A1    Aug. 3, 2017

Related U.S. Application Data

(63) Continuation of application No. PCT/EP2015/066220, filed on Jul. 15, 2015.

(30) Foreign Application Priority Data

Jul. 15, 2014    (DE) .................. 10 2014 213 709

(51) Int. Cl.
| | |
|---|---|
| *B60T 11/22* | (2006.01) |
| *B60T 11/26* | (2006.01) |
| *B60T 17/06* | (2006.01) |
| *B60T 17/18* | (2006.01) |

(52) U.S. Cl.
CPC .............. *B60T 11/22* (2013.01); *B60T 11/26* (2013.01); *B60T 17/06* (2013.01); *B60T 17/18* (2013.01)

(58) Field of Classification Search
CPC .......... B60T 11/22; B60T 11/26; B60T 17/06; B60T 17/18
USPC ........................................... 60/585
See application file for complete search history.

(56) References Cited

U.S. PATENT DOCUMENTS

| | | | | |
|---|---|---|---|---|
| 4,133,178 A | * | 1/1979 | Brooks, Sr. ............. | B60T 11/20 137/493.8 |
| 6,290,306 B1 | * | 9/2001 | Friedow ................... | B60T 8/32 303/113.3 |
| 2004/0148931 A1 | | 8/2004 | Lange | |

(Continued)

FOREIGN PATENT DOCUMENTS

| | | |
|---|---|---|
| DE | 7811277 U1 | 8/1978 |
| DE | 19639560 A1 | 4/1998 |

(Continued)

OTHER PUBLICATIONS

ISR dated Nov. 2, 2015 of corresponding PCT application PCT/EP2015/066220.

(Continued)

*Primary Examiner* — Thomas E Lazo

(57) ABSTRACT

The invention relates to a brake fluid container for a master cylinder in a hydraulic brake system. A safety valve is provided to ensure that the neck of the brake fluid container closes when the brake fluid container is detached from the master cylinder, for example in case of an accident. The safety valve is disposed in a cartridge which can be inserted from outside in a tightly sealing manner into the neck of the container.

10 Claims, 1 Drawing Sheet

(56) References Cited

U.S. PATENT DOCUMENTS

| | | | |
|---|---|---|---|
| 2004/0182658 A1* | 9/2004 | Dimsey | B60T 11/165 188/72.4 |
| 2005/0269180 A1 | 12/2005 | Von Hayn et al. | |
| 2016/0075317 A1 | 3/2016 | Lemke et al. | |

FOREIGN PATENT DOCUMENTS

| | | |
|---|---|---|
| DE | 10135793 C1 | 4/2003 |
| DE | 10234541 A1 | 2/2004 |
| DE | 102013006870 A1 | 10/2014 |
| EP | 2216220 A1 | 8/2010 |
| GB | 2230831 A | 10/1990 |

OTHER PUBLICATIONS

DE search report dated Mar. 18, 2015 of corresponding German patent application 10 2014 213 709.8.
English Abstract of EP 2 216 220 A1.
Japanese Office Action drafted Nov. 13, 2017 for corresponding Japanese application No. 2016-574432 with English translation via Global Dossier.

* cited by examiner

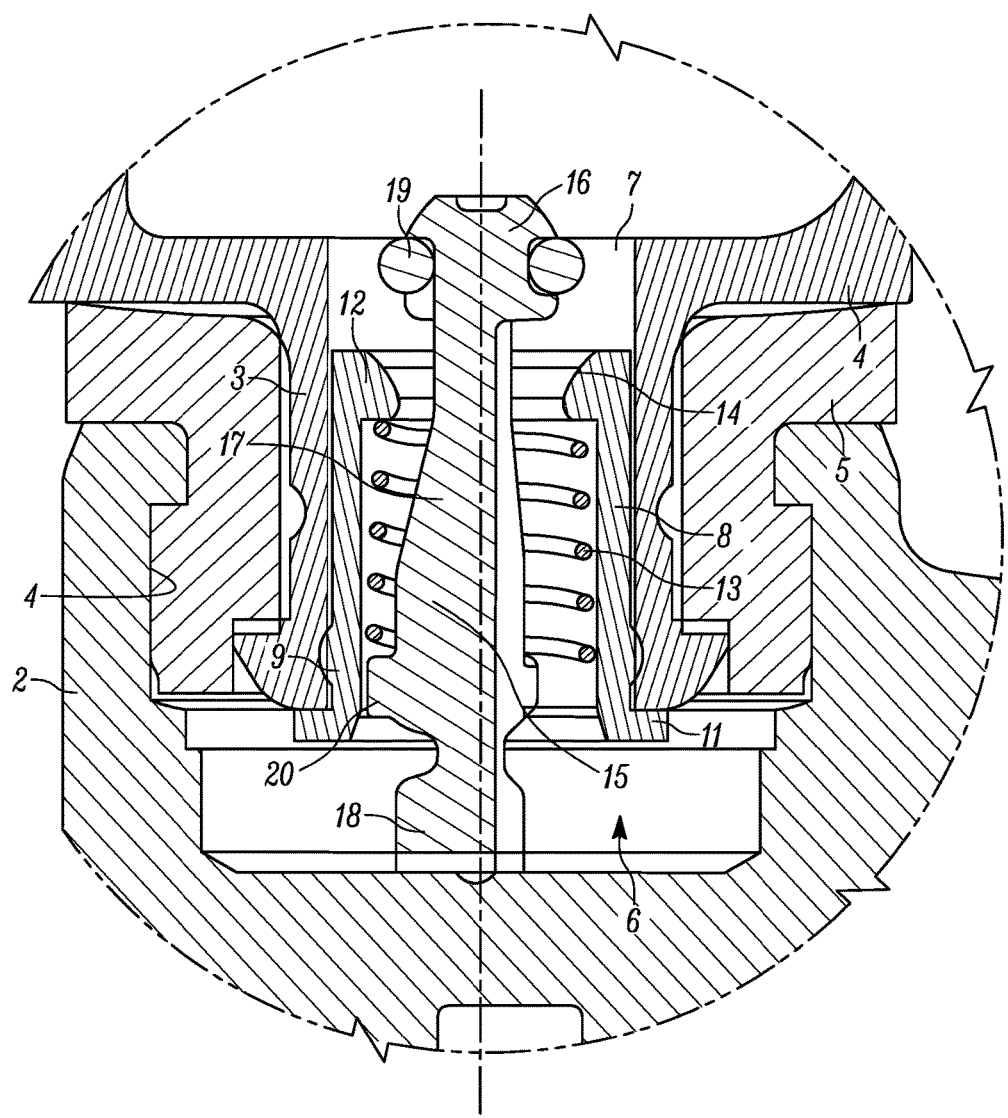

BRAKE FLUID CONTAINER

CROSS-REFERENCE TO RELATED APPLICATIONS

This application claims the benefit of PCT Application PCT/EP2015/066220, filed Jul. 15, 2015, which claims priority to German Application DE 10 2014 213 709.8, filed Jul. 15, 2014. The disclosures of the above applications are incorporated herein by reference.

TECHNICAL FIELD

This invention relates to a fluid container for a brake system for an automotive vehicle.

BACKGROUND

Safety valves are used to ensure that no brake fluid emerges from the container when the latter is detached from the master cylinder, for example following a crash, which could where applicable then become ignited on hot engine parts.

With the configurations of the safety valve known up until now its valve seat is configured as part of the container base, so that the mounting of the valve closure body is relatively complicated since the latter is located inside the container.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The invention proposes that the safety valve is arranged in a cartridge which is inserted in the neck. This has the result that the container can be made independently of this cartridge and the cartridges can be pre-assembled independently of the container. The pre-assembled cartridge can then be pushed into the neck and preferably into the end of the neck which is remote from the container.

The cartridge can then be configured so that it is also provided as a conversion kit for existing containers for sliding into the necks by way of example during service work.

For this the cartridge consists preferably of a sleeve which has means provided on the outer lateral surface in order to hold the cartridge in a tightly sealing manner in the neck.

Any connection which ensures that the inserted sleeve is located in a tightly sealing manner in the neck is conceivable, therefore it can be a screw connection, a welded connection, a snap-fit connection or the like.

A circumferential bead is preferably provided on the outer lateral surface and is pressed into the inner lateral surface of the neck.

In order to form the safety valve the sleeve has at its end facing the container an inwardly directed circumferential collar whose end surface which is directed inwards into the sleeve serves as a stop face for a valve spring and whose end surface which is directed outwards serves as a valve seat face.

The outwardly directed end surface forming the valve seat face can be flat and run perpendicular to the axis of the sleeve.

Alternatively the outwardly directed end surface can have a funnel-shaped configuration and expand conically outwards.

The valve closure body has a head which is located outside of the sleeve in front of the valve seat face, and a sealing element located at its outer edge.

In order to actuate the valve the head is adjoined by a shaft which is guided through the sleeve and ends at its lower end in a tappet.

In its central region the shaft has a radial expansion whose end surface directed inwards into the sleeve serves as a counter stop face for the spring.

So that a sufficient through-flow is enabled between the shaft and the sleeve the expansion can be provided on its outer wall with recesses.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows a sectional view of a master cylinder and a brake fluid container for a brake system of the present invention.

DETAILED DESCRIPTION

The invention will now be explained in further detail below using an exemplary embodiment shown in a single FIGURE:

The FIGURE shows in a sectional view the socket 1 of a master cylinder 2 in which the neck 3 of a brake fluid container 4, hereinafter called just "container" for short, is inserted and is held by a container stopper 5.

A cartridge 6 with a safety valve 7 is located inside the neck 3. The cartridge 6 consists of a sleeve 8 whose outer diameter corresponds substantially to the inner diameter of the neck 3. In order to obtain a pressure-tight sealed connection the sleeve 8 has on its outer edge a circumferential bead 9 which seals the inner lateral surface of the neck 3.

At the lower end of the sleeve 8, which is the end which faces towards the master cylinder 2, there is a circumferential flange 11 which serves as a stop when the sleeve 8 is pushed into the neck 3 from below.

At the upper end of the sleeve there is an inwardly directed circumferential collar 12 whose downwardly directed end surface serves as a stop for a valve spring 13 and whose upwardly directed end surface has a funnel-shaped configuration, expands conically upwards and serves as the valve seat face 14.

A valve closure body 15, consisting of a head 16 and a shaft 17 which adjoins the head 16 in an axial direction and which ends at its lower end in a tappet 18, extends through the sleeve 8.

The head 16 has a circumferential sealing element 19 which lies in a groove and is opposite the valve seat face 14 and which has the form of a sealing ring.

At the lower end of the shaft there is a radial expansion 20 whose upwardly directed end surface serves as the counter stop face for the valve spring 13 which extends coaxially to the shaft 17 between the stop face on the collar 12 of the sleeve and the expansion 20 of the shaft 17 and which is pretensioned so that it presses the shaft 17 downwards so that the head 16 is placed with the sealing element 19 against the valve seat face 14 in order to close the safety valve 7.

In the installed state this is prevented in that the tappet 18 adjoins the base of the socket 1, and thus holds the head 16 against the pressure of the valve spring 13 away from the valve seat face 14. Should the container 4 become detached from the neck 3, for example in the event of a crash, then this counter force dissipates so that the safety valve 7 closes.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. A brake fluid container for a master cylinder of a hydraulic brake system comprising:
   a container base;
   a neck protruding relative to an outside of the container base for insertion into a socket of the master cylinder;
   a safety valve mounted in a cartridge which is inserted into the neck; and
   a valve closure body of the safety valve which interacts with the socket so that the safety valve is opened when the neck is introduced into the socket, and is closed when the neck is located outside of the socket.

2. The brake fluid container of claim 1, wherein the cartridge further comrises a sleeve on an outer lateral surface with an retaining element for holding the sleeve in the neck in a pressure-tight sealing manner.

3. The brake fluid container of claim 2, wherein the outer lateral surface of the sleeve is provided with a circumferential bead, which is pressed into the inner lateral surface of the neck.

4. The brake fluid container of claim 1, further comprising an inwardly directed circumferential collar at the end of the safetly valve sleeve facing the container, wherein the collar end surface is directed inwards into the sleeve and serves as a stop face for a valve spring and whose outwardly directed end surface serves as a valve seat face.

5. The brake fluid container of claim 4, wherein the outwardly directed end surface is flat and runs perpendicular to the axis of the sleeve.

6. The brake fluid container of claim 4, wherein the outwardly directed end surface has a funnel-shaped configuration and expands conically outwards.

7. The brake fluid container of claim 6, wherein the valve closure body has a head which is located outside of the sleeve in front of the valve seat face, and has a sealing element located on its outer edge.

8. The brake fluid container of claim 7, wherein the head sits on a shaft through which the sleeve is guided and whose lower end ends in a tappet.

9. The brake fluid container of claim 8, wherein the shaft has in its central region a radial expansion whose end surface directed inwards into the sleeve serves as a counter stop face for the valve spring.

10. The brake fluid container of claim 9, wherein the expansion is provided on an outer edge by recesses.

\* \* \* \* \*